(12) United States Patent
Seki (10) Patent No.: US 10,984,005 B2
(45) Date of Patent: Apr. 20, 2021

(54) DATABASE SEARCH APPARATUS AND METHOD OF SEARCHING DATABASES

(71) Applicant: FUJITSU LIMITED, Kawasaki (JP)

(72) Inventor: Eiji Seki, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 15/712,842

(22) Filed: Sep. 22, 2017

(65) Prior Publication Data
US 2018/0095968 A1    Apr. 5, 2018

(30) Foreign Application Priority Data

Oct. 5, 2016    (JP) .............................. JP2016-197598

(51) Int. Cl.
| | | |
|---|---|---|
| *G06F 16/20* | (2019.01) | |
| *G06F 16/2457* | (2019.01) | |
| *G06F 16/22* | (2019.01) | |
| *G06F 16/2458* | (2019.01) | |

(52) U.S. Cl.
CPC .... *G06F 16/24578* (2019.01); *G06F 16/2246* (2019.01); *G06F 16/2462* (2019.01)

(58) Field of Classification Search
None
See application file for complete search history.

(56) References Cited

U.S. PATENT DOCUMENTS

| 6,018,733 A * | 1/2000 | Kirsch ..................... G06F 16/30 |
| 2002/0046002 A1 * | 4/2002 | Tang .................. G06K 9/00536 |
| | | 702/182 |
| 2007/0136274 A1 | 6/2007 | Takuma et al. |
| 2008/0059407 A1 * | 3/2008 | Barsness ............. G06F 16/2471 |
| 2008/0059431 A1 * | 3/2008 | Aoki ..................... G06F 16/319 |
| 2008/0154882 A1 | 6/2008 | Chigusa et al. |
| 2012/0215764 A1 * | 8/2012 | Barsness ............... G06F 16/951 |
| | | 707/720 |
| 2015/0153906 A1 * | 6/2015 | Liao ....................... G06F 16/78 |
| | | 715/709 |

FOREIGN PATENT DOCUMENTS

| JP | 2006-350770 | 12/2006 |
| JP | 2007-156739 | 6/2007 |
| JP | 2007-172516 | 7/2007 |
| JP | 2008-158685 | 7/2008 |
| JP | 2011-113205 | 6/2011 |

\* cited by examiner

*Primary Examiner* — Jau Shya Meng
(74) *Attorney, Agent, or Firm* — Staas & Halsey LLP (57) ABSTRACT

A database search apparatus includes a processor that receives a search query including first keys. The processor calculates a first score based on statistical information. The first score represents search performance of searching a first database in accordance with the search query. The first database stores a data group including combinations of a key and a value of the key. The statistical information includes information regarding each key included in the data group. The processor calculates a second score based on the statistical information. The second score represents search performance of searching a second database different from the first database in accordance with the search query, the second database storing the data group. The processor selects the first database or the second database based on the first score and the second score. The processor instructs the selected database to performing a search in accordance with the search query.

6 Claims, 12 Drawing Sheets

FIG. 1

| KEY | VALUE | FORM ID |
|---|---|---|
| PRODUCT | FLUORESCENT LAMP | 1 |
| DATE | 20151130 | 1 |
| ⋮ | ⋮ | ⋮ |
| DESCRIPTION | FLUORESCENT LAMP OF NEW PRODUCT ANNOUNCED IN EARLY NOVEMBER | 13 |

| NUMBER OF VALUE TYPES | k |
|---|---|
| APPEARANCE FREQUENCY | m |
| VALUE #1 | p#1 |
| VALUE #2 | p#2 |
| ⋮ | ⋮ |
| VALUE #n | p#n |
| HISTOGRAM DATA | |

FIG. 3B

| NUMBER OF WORD TYPES | r |
|---|---|
| APPEARANCE FREQUENCY | s |
| WORD #1 | q#1 |
| WORD #2 | q#2 |
| ⋮ | ⋮ |
| WORD #n | q#n |
| HISTOGRAM DATA | |

FIG. 3C

| NUMBER OF DOCUMENTS | u |
|---|---|
| NUMBER OF KEY TYPES | v |

FIG. 4

```
{
  "$query": {
    "$and": {
      "date": { "$min": "20151001", "$max": "20151130" },
      "$or": { "description": "*CHANDELIER*",
               "description": "*FLUORESCENT LAMP*" }
    }
  },
  "$sort": "date",
  "$limit": 20
}
```

```
{
  "date": "20151130"
  "product_name": "FLUORESCENT LAMP"
  "unit_price": "3000"
  "number": "20"
  "manufacturer": "ABCD Inc."
  "description": "FLUORESCENT LAMP OF NEW PRODUCT ANNOUNCED IN
                  EARLY NOVEMBER"
}
```

DATABASE SEARCH APPARATUS AND METHOD OF SEARCHING DATABASES

CROSS-REFERENCE TO RELATED APPLICATION

This application is based upon and claims the benefit of priority of the prior Japanese Patent Application No. 2016-197598, filed on Oct. 5, 2016, the entire contents of which are incorporated herein by reference.

FIELD

The embodiment discussed herein is related to a database search apparatus and a method of searching databases.

BACKGROUND

Document search engines such as Lucene (registered trademark), etc., are used in document search in which a plurality of documents are stored and documents satisfying a predetermined condition are searched for using a key-value (KV) regarding a document. In the document search, for example, the following searches are performed in regard to the forms: "extract forms relating to purchase and sale of a personal computer"; "extract transactions from August to October of this year"; and "extract transactions of 100,000 yen or more". In these examples, the KV is "product—personal computer", "transaction date—August to October this year", and "price—100,000 yen or more".

Each document has a plurality of keys and one value for each key. The number of keys is not fixed, but increases in the course of operation of a document management system managing the documents. The number of used keys ranges from one to over a dozen depending on the search.

A relational database (RDB) system is often used when the search is performed while storing a data group, but the RDB system is not used in the document search. The reason is that it has been considered that the RDB system is not suitable for search of the KV type. Hereinafter, the RDB system is simply referred to as RDB. In addition, the document search engine is represented by DSE.

Figure 14:
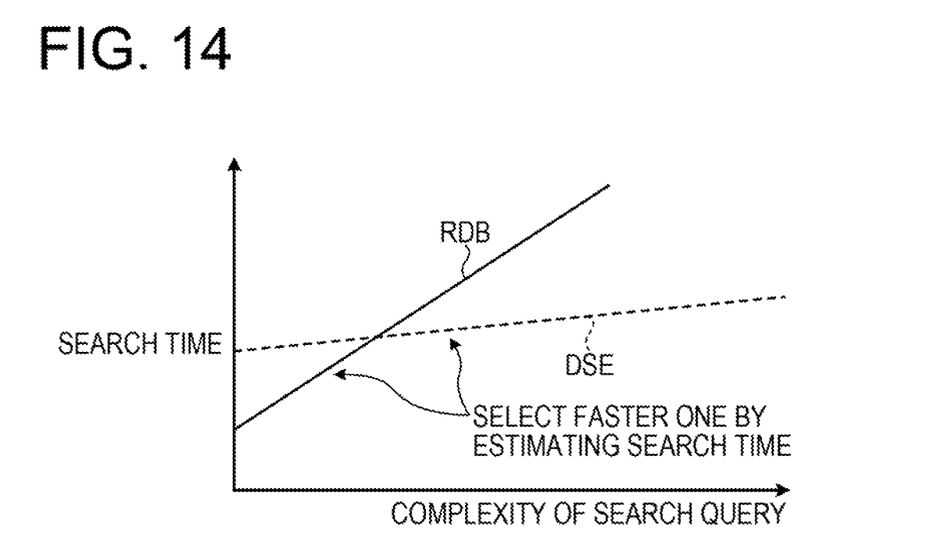
FIG. 14 is a diagram illustrating a search time of an RDB and a DSE.

However, when the document search is actually performed using the RDB, a search time is faster or slower than the case where the DSE is used depending on a search query. FIG. 14 is a diagram illustrating the search time of the RDB and the DSE. The horizontal axis represents complexity of the search query and the vertical axis represents a search time. As illustrated in FIG. 14, when the search query is not complicated, the RDB is faster than the DSE, and when the search query is complicated, the DSE is faster than the RDB. Therefore, a document search apparatus is considered, which estimates the search time of the RDB and the DSE and selects faster one in search to perform the search.

In a text search, there is a technique for performing an efficient search using a first index that specifies a list of keywords included in a text on the basis of identification information of the text and a second index that specifies a list of texts including a keyword on the basis of identification information of the keyword.

There is a technique that predicts, when a full-text search is performed, the search time for each of a text scan method and an index scan method and conducts search with the search method having a shorter search time. In addition, there is a system that estimates a time required for searching actual data on the basis of a received search condition, determines a processing method on the basis of the estimation result to automatically separate processing methods on the basis of the determination result, and searches the actual data.

There is also a search system that may improve the search performance by dynamically adjusting the number of indexes so as to minimize search cost. In addition, there is a technique for predicting a time required for searching a database by a structured query language (SQL) sentence in an environment with different hardware performance or the like on the basis of the time required for the search by the SQL sentence in a development environment.

Related techniques are disclosed in, for example, Japanese Laid-Open Patent Publication No. 2007-156739, Japanese Laid-Open Patent Publication No. 2008-158685, Japanese Laid-Open Patent Publication No. 2006-350770, Japanese Laid-Open Patent Publication No. 2011-113205, and Japanese Laid-Open Patent Publication No. 2007-172516.

A document search apparatus that estimates the search time of an RDB and a DSE and selects the faster one in search to perform the search has a problem in that when the search time is inaccurately estimated, the faster one in search is not appropriately selected.

SUMMARY

According to an aspect of the present invention, provided is a database search apparatus including a memory and a processor coupled to the memory. The processor is configured to receive a search query including first keys. The processor is configured to calculate a first score on basis of statistical information. The first score represents search performance of searching a first database in accordance with the search query. The first database stores a data group including combinations of a key and a value of the key. The statistical information includes information regarding each key included in the data group. The processor is configured to calculate a second score on basis of the statistical information. The second score represents search performance of searching a second database different from the first database in accordance with the search query, the second database storing the data group. The processor is configured to select the first database or the second database on basis of the first score and the second score. The processor is configured to instruct the selected database to performing a search in accordance with the search query.

The object and advantages of the invention will be realized and attained by means of the elements and combinations particularly pointed out in the claims. It is to be understood that both the foregoing general description and the following detailed description are exemplary and explanatory and are restrictive of the invention, as claimed.

DESCRIPTION OF EMBODIMENT

Hereinafter, an embodiment will be described in detail with reference to the drawings. Embodiments are not limited to that disclosed herein.

Embodiment

Figure 1:
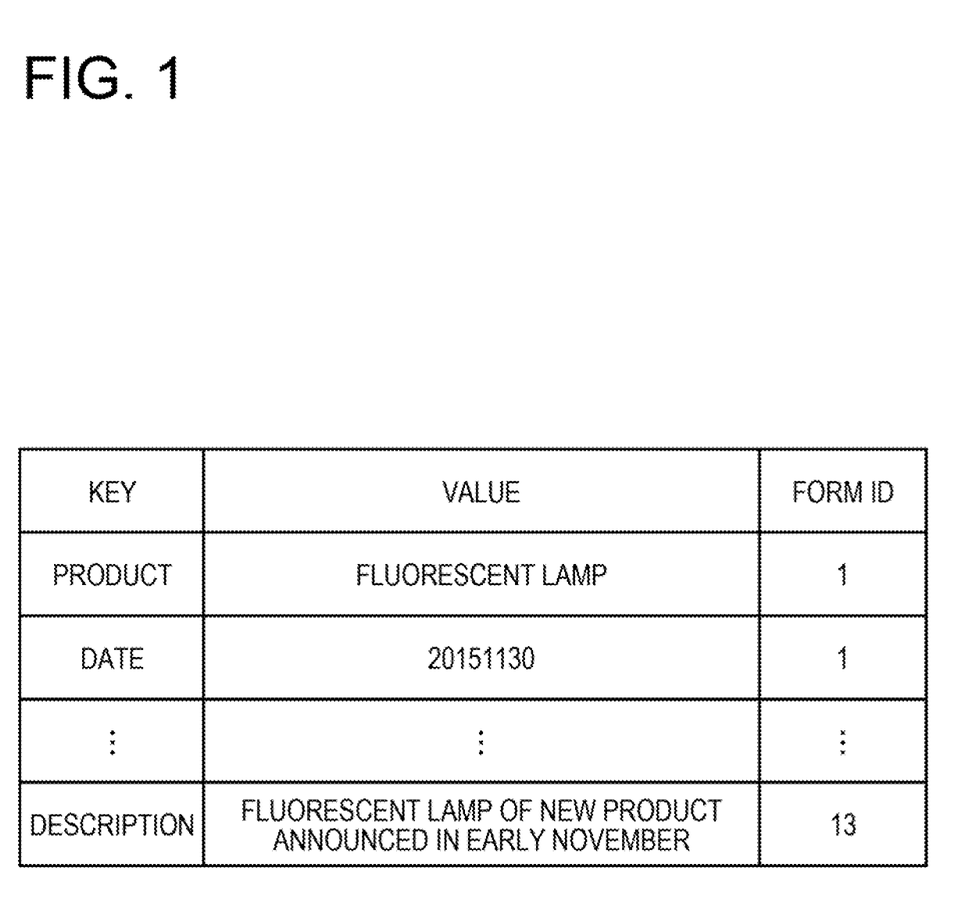
FIG. 1 is a diagram illustrating a method for storing KV data by an RDB according to an embodiment.

First, a method for storing KV data by an RDB according to an embodiment is described. The KV data includes a KV data group. In the following description, a term "data" includes a "data group". FIG. 1 is a diagram illustrating a method for storing KV data by an RDB according to the embodiment. As illustrated in FIG. 1, the RDB according to the embodiment stores a key, a value, and a form identifier (ID) as one tuple. The form ID is an identifier for identifying a form. The form is separately stored in association with the form ID. Therefore, the document search apparatus according to the embodiment searches for the form ID in accordance with a search query to search for the corresponding form.

In FIG. 1, for example, the form having "1" as the form ID includes "product—fluorescent lamp" and "date—Nov. 30, 2015" as the KV. Further, the form having "13" as the form ID includes "Description—fluorescent lamp of new product announced in early November" as the KV.

As illustrated in FIG. 1, the RDB according to the embodiment stores all keys as one column and stores all values as one column. In a normal RDB, statistical information such as a histogram, a frequent value, and an occurrence probability are calculated for each column. Therefore, the statistical information calculated by the normal RDB is statistical information regarding all of the keys. Thus, when the search is performed based on the KV as in the document search, the statistical information is not available for estimating a search time.

Accordingly, the document search apparatus according to the embodiment collects statistical information regarding each key and uses the statistical information regarding each key to estimate the search time. A method of storing keys as one column and values as one column for each key instead of storing all keys as one column and all values as one column is not available because the number of keys is not fixed.

Figure 2:
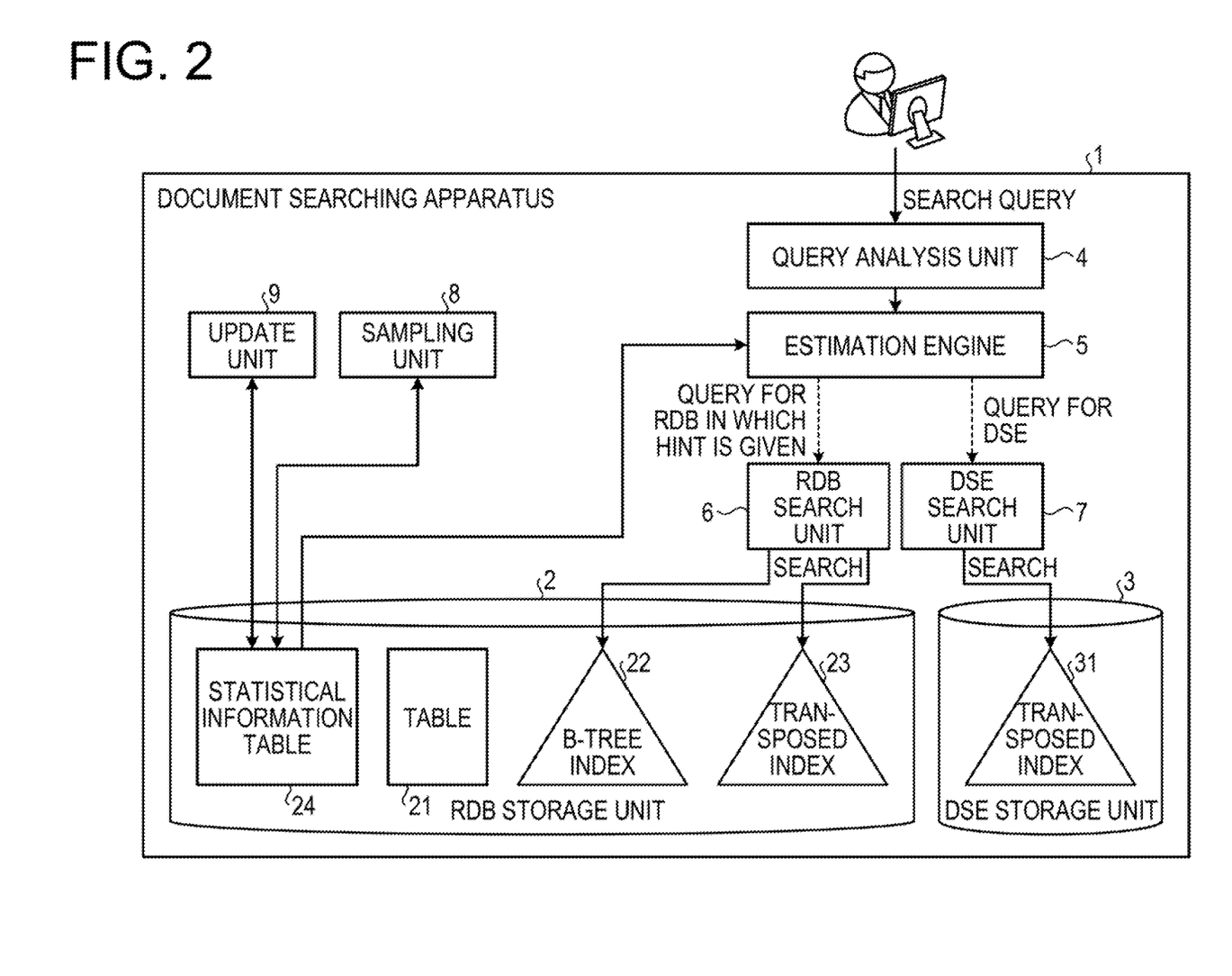
FIG. 2 is a diagram illustrating a functional configuration of a document search apparatus according to an embodiment.

Next, the functional configuration of the document search apparatus according to the embodiment will be described. FIG. 2 is a diagram illustrating the functional configuration of the document search apparatus according to the embodiment. As illustrated in FIG. 2, a document search apparatus 1 according to the embodiment includes an RDB storage unit 2, a DSE storage unit 3, a query analysis unit 4, an estimation engine 5, an RDB search unit 6, a DSE search unit 7, a sampling unit 8, and an update unit 9.

The RDB storage unit 2 stores therein KV data searched by the RDB and information used by the RDB in the search. The RDB storage unit 2 stores therein a table 21, a B-tree index 22, a transposed index 23, and a statistical information table 24.

The table 21 associates KV with an identifier for identifying a form as illustrated in FIG. 1. The B-tree index 22 is an index used for searching the table 21 and used in a forward match search. The transposed index 23 is an index used for searching the table 21 and used in an intermediate match search.

Figure 3A:
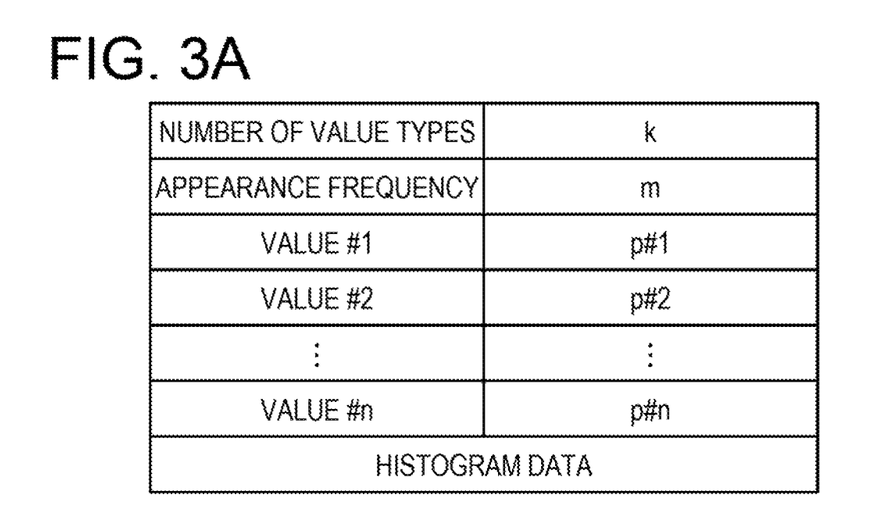
FIGS. 3A to 3C are diagrams illustrating information stored in a statistical information table.
Figure 3B:
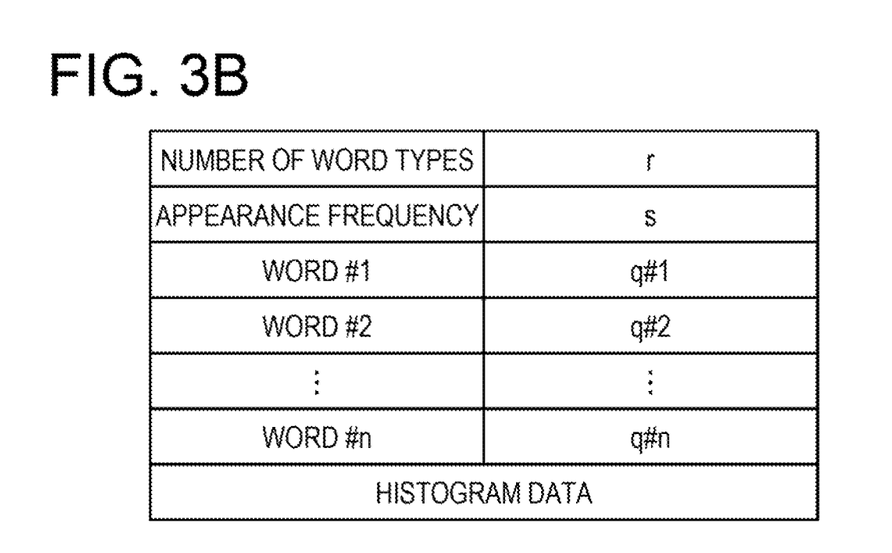
Figure 3C:
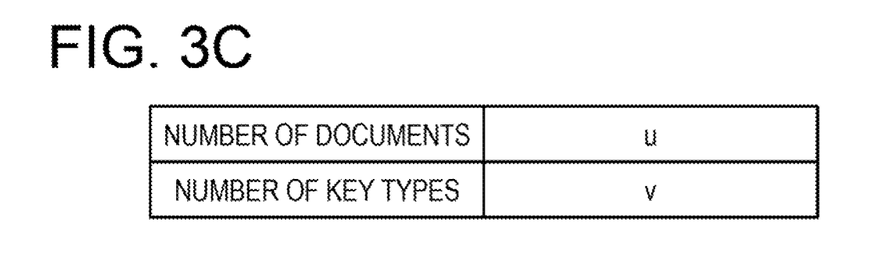

The statistical information table 24 stores therein statistical information regarding the KV data stored in the table 21. FIGS. 3A to 3C are diagrams illustrating information stored in a statistical information table 24. FIG. 3A illustrates statistical information regarding values of each key, FIG. 3B illustrates statistical information regarding words included in the values of each key, and FIG. 3C illustrates statistical information regarding forms.

As illustrated in FIG. 3A, the statistical information regarding values of each key includes the number of value types, an appearance frequency, values #1 to #n, and histogram data. The number of value types represents the number of different values which the key may take and is, for example, k. Herein, k is a positive integer. The appearance frequency represents the number of times the key appears in the table 21 and is, for example, m. Herein, m is a positive integer.

The values #1 to #n represent n values from a value having the highest frequency among the values which the key may take. Appearance probabilities p#1 to p#n are associated with the values #1 to #n, respectively. The histogram data represents data of the histogram regarding the values of the key.

As illustrated in FIG. 3B, the statistical information regarding words included in the values of each key includes the number of word types, an appearance frequency, words #1 to #n, and histogram data. The number of word types represents the number of different words included in the values of the key and is, for example, r. Herein, r is a positive integer. The appearance frequency represents the number of times the key appears in the table 21 and is, for example, s. Herein, s is a positive integer.

The words #1 to #n represent n words from a word having the highest frequency among the words included in the values of the key. Appearance probabilities q#1 to q#n are associated with the words #1 to #n, respectively. The histogram data represents data of the histogram regarding the words included in the values of the key. Grams may be used instead of the words. Herein, the grams represent character strings each consisting of a fixed number of characters.

As illustrated in FIG. 3C, the statistical information regarding forms includes the number of documents and the number of key types. The number of documents represents the number of forms of which information is registered in the table 21 and is, for example, u. Herein, u is a positive integer. The number of key types represents the number of types of the keys included in all forms and is, for example, v. Herein, v is a positive integer.

Referring back to FIG. 2, the DSE storage unit 3 stores therein KV data searched by the DSE and information used by the DSE in the search. The DSE storage unit 3 stores therein a transposed index 31. The DSE performs the search by using the transposed index 31.

Figure 4:
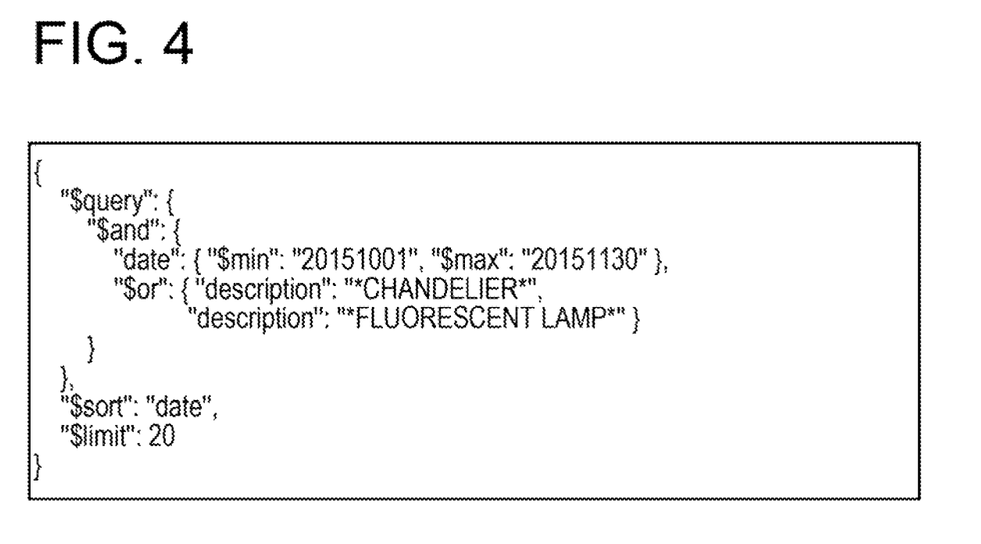
FIG. 4 is a diagram illustrating an example of a search query.

The query analysis unit 4 analyzes a search query, which is input by a user, to perform an error check and the like on the search query and thereafter, transfers the checked search query to the estimation engine 5. FIG. 4 is a diagram illustrating an example of a search query. The search query of FIG. 4 indicates that "IDs of forms regarding chandeliers or fluorescent lamps during a period of Oct. 1, 2015 to Nov. 30, 2015 are to be sorted and a maximum of 20 IDs are to be obtained".

Figure 5:
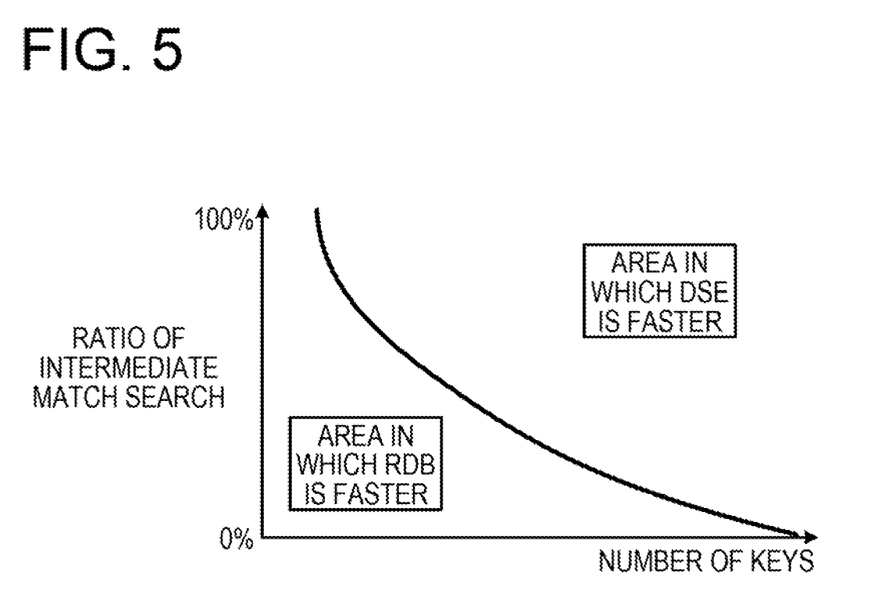
FIG. 5 is a diagram illustrating separation between an RDB and a DSE.

Referring back to FIG. 2, the estimation engine 5 estimates a search time of each of the RDB and the DSE with reference to the statistical information table 24 and selects one of the RDB and the DSE, which is faster in search. FIG. 5 is a diagram illustrating separation between the RDB and the DSE. The horizontal axis of FIG. 5 indicates the number of keys included in the search query and, the vertical axis represents a ratio in which an intermediate match search is performed with respect to the keys included in the search query. As illustrated in FIG. 5, the estimation engine 5 selects the DSE when the number of keys is large or the ratio of the intermediate match search is large and selects the RDB when the number of keys is small or the ratio of the intermediate match search is small.

The estimation engine 5 converts the search query into a query (referred to as a hint-attached RDB query) of the RDB with a hint when selecting the RDB, and converts the search query into a query (referred to as a DSE query) of the DSE when selecting the DSE. Herein, the hint is information designating whether the forward match search or the intermediate match search is to be performed for the respective keys and how to merge search results for the respective keys. The estimation engine 5 will be described later in detail.

Referring back to FIG. 2, the RDB search unit 6 searches form IDs by using the RDB storage unit 2. The RDB search unit 6 searches the form IDs by using the hint attached to the query of the RDB by the estimation engine 5. In the embodiment, the RDB search unit 6 and the RDB storage unit 2 are collectively called the RDB.

The DSE search unit 7 searches the form IDs by using the DSE storage unit 3. In the embodiment, the DSE search unit 7 and the DSE storage unit 3 are collectively called the DSE.

The sampling unit 8 prepares histogram data with respect to keys having an appearance frequency equal to or more than a threshold value among KVs registered in the table 21 and calculates appearance probability of values having a high appearance frequency and registers the prepared histogram data and the calculated appearance probability in the statistical information table 24. The sampling unit 8 performs processing, for example, at predetermined time intervals.

Figure 6:
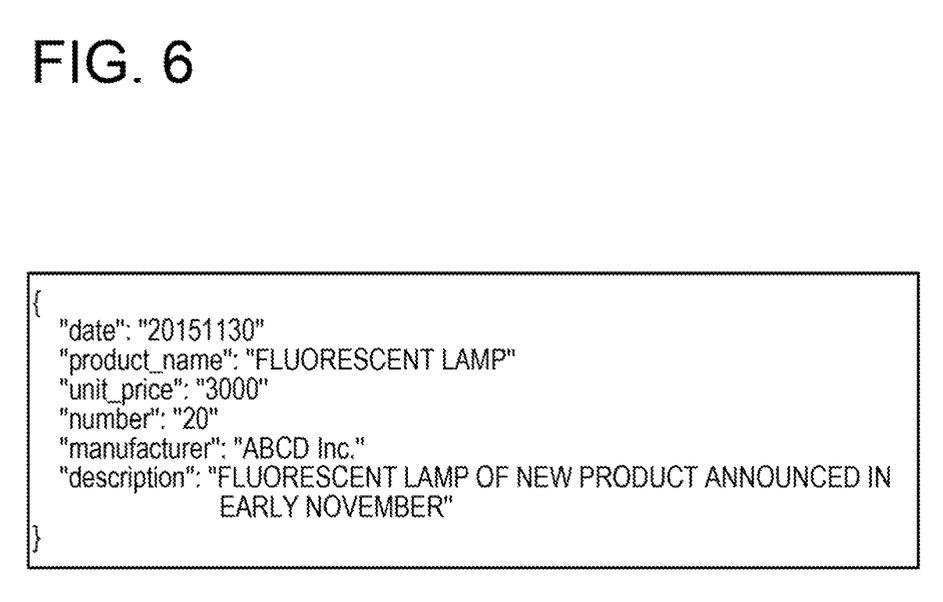
FIG. 6 is a diagram illustrating an example of KV data.

The update unit 9 adds 1 to the number of documents in the statistical information table 24 when a new form is added. Further, the update unit 9 adds the form ID of the new form to the KV data representing contents of the new form, and adds the KV data associated with the form ID to the RDB storage unit 2 and the DSE storage unit 3. FIG. 6 is a diagram illustrating an example of the KV data. FIG. 6 illustrates a form in which the date is "Nov. 30, 2015", the product name is "fluorescent lamp", the unit price is "3000", the number is "20", the manufacturer is "ABCD Inc.", and the description is "the fluorescent lamp of the new product announced in the early November". Further, the update unit 9 updates the appearance frequency of the statistical information table 24 with respect to each key.

Figure 7:
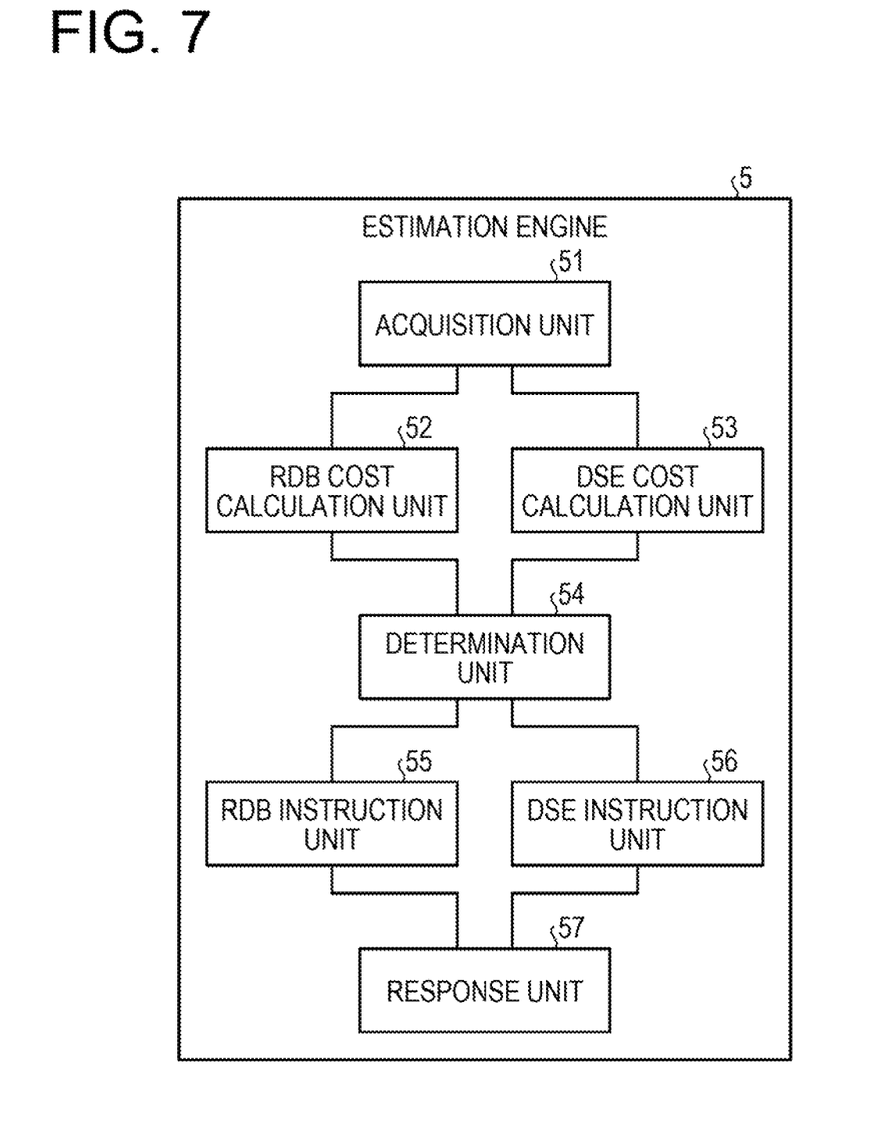
FIG. 7 is a diagram illustrating a functional configuration of an estimation engine.

Next, the functional configuration of the estimation engine 5 will be described. FIG. 7 is a diagram illustrating the functional configuration of the estimation engine 5. As illustrated in FIG. 7, the estimation engine 5 include an acquisition unit 51, an RDB cost calculation unit 52, a DSE cost calculation unit 53, a determination unit 54, an RDB instruction unit 55, a DSE instruction unit 56, and a response unit 57.

The acquisition unit 51 acquires the search query from the query analysis unit 4 and transfers the acquired search query to the RDB cost calculation unit 52 and the DSE cost calculation unit 53.

The RDB cost calculation unit 52 calculates a search cost (referred to as an RDB search cost) of a search performed by the RDB in regard to the search query transferred from the acquisition unit 51. Herein, the search cost is an estimated value of the search time. The RDB cost calculation unit 52 calculates the search cost using the index for each key with reference to the statistical information table 24 and calculates the RDB search cost on the basis of the search cost for the respective keys and a merge cost of merging the search results for the respective keys.

The search cost for the respective keys in the case of the forward match search is acquired by O(log(the number of key types)+log(the number of value types of the key))*the number of acquired forms. The search cost for the respective keys in the case of the intermediate match search is acquired by O(log(the number of key types)+log(the number of word types in the values of the key))*the number of acquired forms.

Herein, O represents an order and a value of a specific search cost is calculated by using predetermined coefficients. Further, the number of acquired forms represents an estimated value of the number of forms acquired by the search and when the search condition designates the value of the key or designates the word included in the value of the key, the number of acquired forms represents a value acquired by multiplying the number of documents by the appearance probability corresponding to the value or the word. When the search condition designates a range of the key, the number of acquired forms is a value acquired by multiplying the number of documents by the appearance probability calculated depending on the range on the basis of the histogram data.

The RDB cost calculation unit 52 selects minimum one among the following three combinations to calculate the merge cost.

nested loop combination=cost: O(M*N)
merge sort combination=cost: O(MlogM+NlogN)
hash combination=cost: O(M+N)

The above-described costs are costs when the number of keys is two, and M and N represent the estimated values of the number of forms acquired by the respective keys. Herein, "*" represents multiplication.

The RDB cost calculation unit 52 calculates the RDB search cost by the following expression.

(the number of key types)*(sum of search cost for the respective keys)+(the number of ANDs and ORs)*(merge cost)

The DSE cost calculation unit 53 calculates a search cost (referred to as a DSE search cost) of a search performed by the DSE in regard to the search query received from the acquisition unit 51. The DSE cost calculation unit 53 calculates the search cost using the index for each key with reference to the statistical information table 24 and calculates the DSE search cost on the basis of the search cost for the respective keys and a merge cost of merging the search results for the respective keys.

The search cost for respective keys is acquired by O(log (the number of key types)+log(the number of documents)+log (the number of word types in the values of the key))*the number of acquired forms.

The merge cost is almost 0 in the case of the AND combination and is proportional to the sum of the search cost for the respective keys in the case of the OR combination.

The DSE cost calculation unit 53 calculates the DSE search cost by the following expression.

(the number of key types)*(sum of search cost for the respective keys)+(the number of ORs)*(merge cost)

The determination unit 54 compares the RDB search cost calculated by the RDB cost calculation unit 52 and the DSE search cost calculated by the DSE cost calculation unit 53 with each other to select one of the RDB and the DSE, which is lower in search cost. When the determination unit 54 selects the RDB, the RDB instruction unit 55 converts the search query into a hint-attached RDB query and instructs, with a hint, the RDB to perform the search. The RDB instruction unit 55 instructs the RDB to perform a search with a hint, and as a result, the RDB may efficiently perform the search on the basis of the statistical information regarding each key.

The DSE instruction unit 56 converts the search query into a DSE query and instructs the DSE to perform a search when the determination unit 54 selects the DSE. The response unit 57 transmits a search result of the search performed by the RDB or DSE to a client used by the user.

Figure 8:
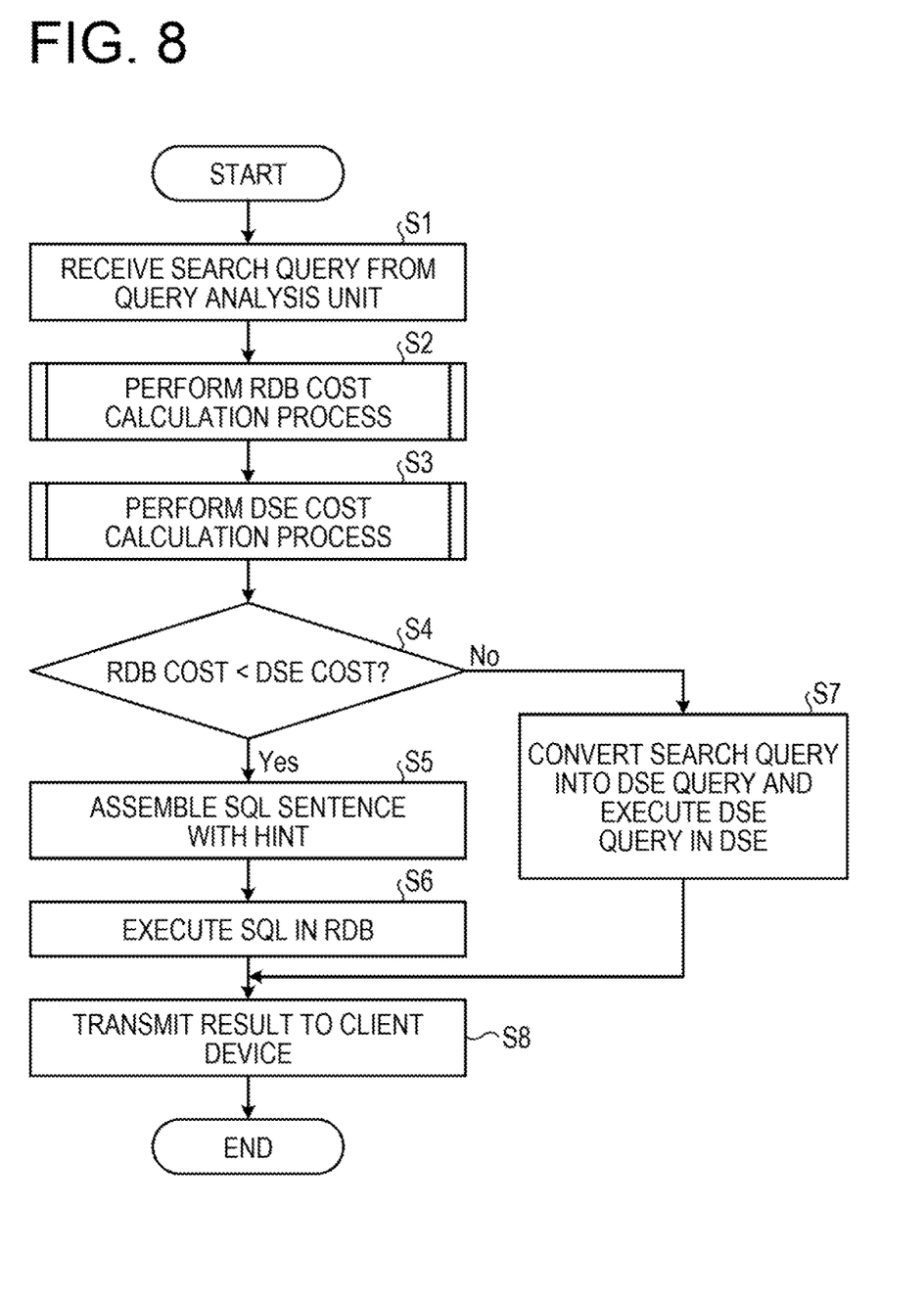
FIG. 8 is a flowchart illustrating a flow of processing performed by an estimation engine.

Next, a flow of processing performed by the estimation engine 5 will be described. FIG. 8 is a flowchart illustrating the flow of processing performed by the estimation engine 5. As illustrated in FIG. 8, the estimation engine 5 receives a search query from the query analysis unit 4 (S1).

The estimation engine 5 then performs an RDB cost calculation process of calculating an RDB search cost (S2) and performs a DSE cost calculation process of calculating a DSE search cost (S3). The estimation engine 5 may first perform the DSE cost calculation process and later perform the RDB cost calculation process.

The estimation engine 5 then determines whether the RDB search cost is lower than the DSE search cost (S4). When it is determined that the RDB search cost is lower than the DSE search cost, the estimation engine 5 assembles an SQL sentence in which a hint is given such that the search and merge for the respective keys follow the cost calculation (S5). The estimation engine 5 executes the SQL in the RDB (S6) and transmits the result to the client device used by the user (S8).

When it is determined that the RDB search cost is not lower than the DSE search cost, the estimation engine 5 converts the search query into a DSE query and executes the DSE query in the DSE (S7) and transmits the result to the client device used by the user (S8).

Figure 9:
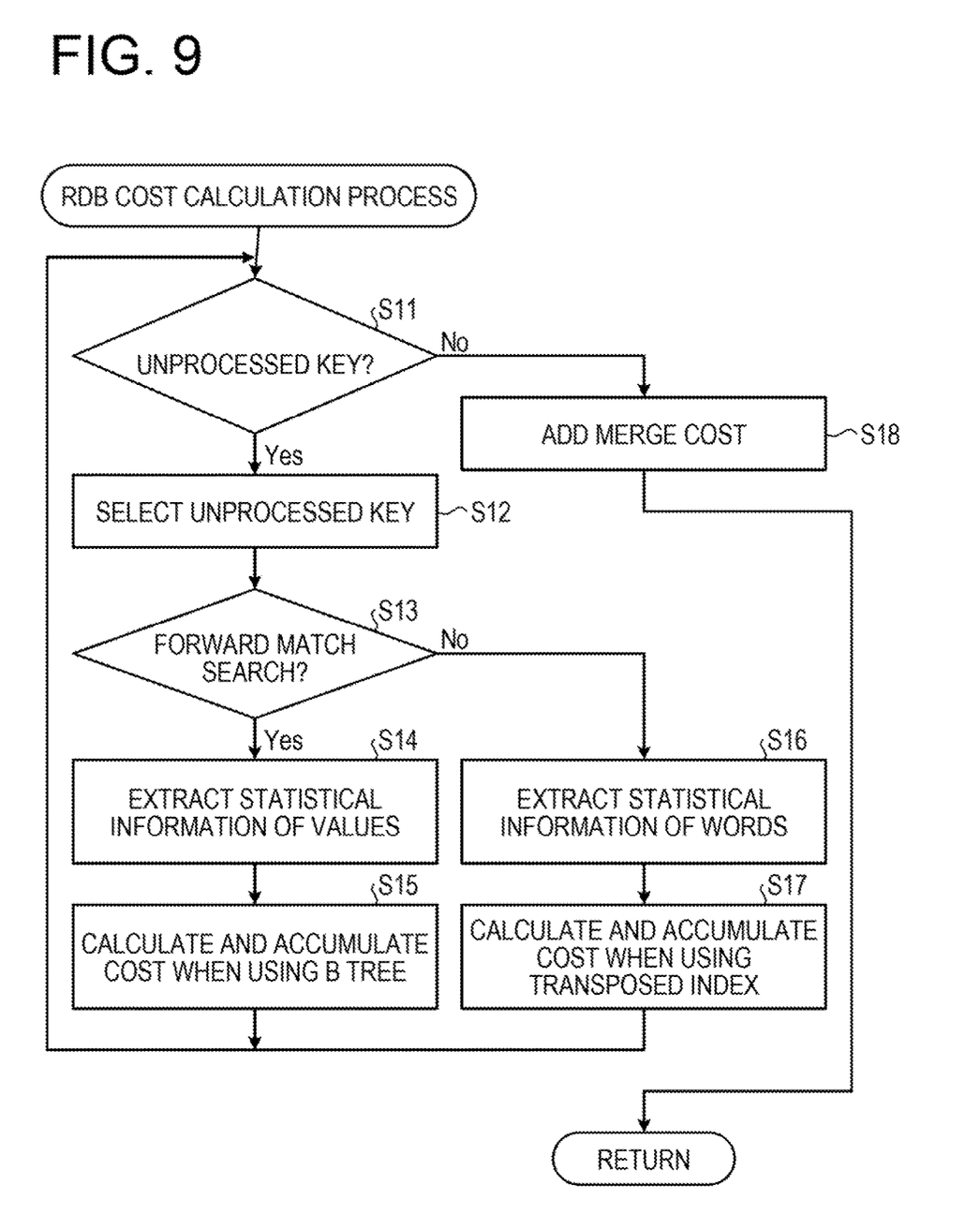
FIG. 9 is a flowchart illustrating a flow of an RDB cost calculation process.

FIG. 9 is a flowchart illustrating a flow of the RDB cost calculation process. As illustrated in FIG. 9, the RDB cost calculation unit 52 determines whether there is an unprocessed key in the search query (S11). When it is determined that there is an unprocessed key, the RDB cost calculation unit 52 arbitrarily selects one unprocessed key (S12).

The RDB cost calculation unit 52 determines whether the search for the selected key is the forward match search (S13). When it is determined that the search for the selected key is the forward match search, the RDB cost calculation unit 52 extracts statistical information regarding values associated with the key from the statistical information table 24 (S14). In addition, the RDB cost calculation unit 52 calculates the cost when using a B-tree on the basis of the statistical information and adds the calculated cost to a cost calculation result (S15). Thereafter, the RDB cost calculation unit 52 returns to S11.

When it is determined that the search for the selected key is not the forward match search, the RDB cost calculation unit 52 extracts statistical information regarding words associated with the key from the statistical information table 24 (S16). In addition, the RDB cost calculation unit 52 calculates the cost when using the transposed index on the basis of the statistical information and adds the calculated cost to the cost calculation result (S17). Thereafter, the RDB cost calculation unit 52 returns to S11.

When it is determined that there is no unprocessed key in S11, the RDB cost calculation unit 52 calculates the merge cost and adds the merge cost multiplied by (the number of ANDs and ORs) to the cost calculation result (S18).

Figure 10:
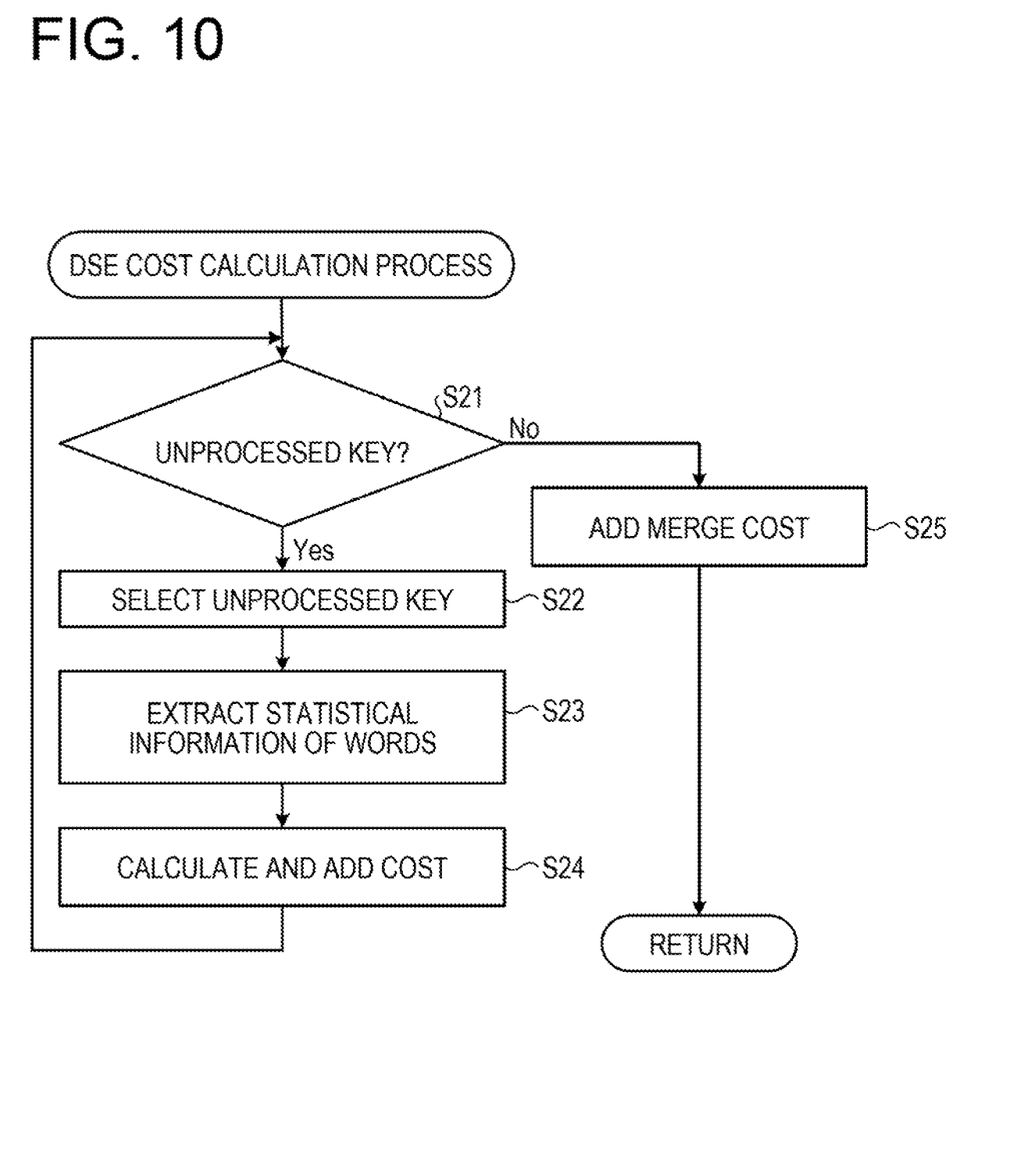
FIG. 10 is a flowchart illustrating a flow of a DSE cost calculation process.

FIG. 10 is a flowchart illustrating the flow of the DSE cost calculation process. As illustrated in FIG. 10, the DSE cost calculation unit 53 determines whether there is an unprocessed key in the search query (S21). When it is determined that there is an unprocessed key, the DSE cost calculation unit 53 arbitrarily selects one unprocessed key (S22).

The DSE cost calculation unit 53 extracts statistical information regarding words associated with the key from the statistical information table 24 (S23) and calculates the cost on the basis of the statistical information and adds the calculated cost to the cost calculation result (S24). Thereafter, the DSE cost calculation unit 53 returns to S21.

When it is determined that there is no unprocessed key in S21, the DSE cost calculation unit 53 calculates the merge cost and adds the merge cost multiplied by (the number of ORs) to the cost calculation result (S25).

As described above, the estimation engine 5 calculates the RDB search cost and the DSE search cost, and performs the search by one of the RDB and the DSE, which is lower in search cost, and as a result, the document search apparatus 1 may shorten the time for processing the search query.

Figure 11:
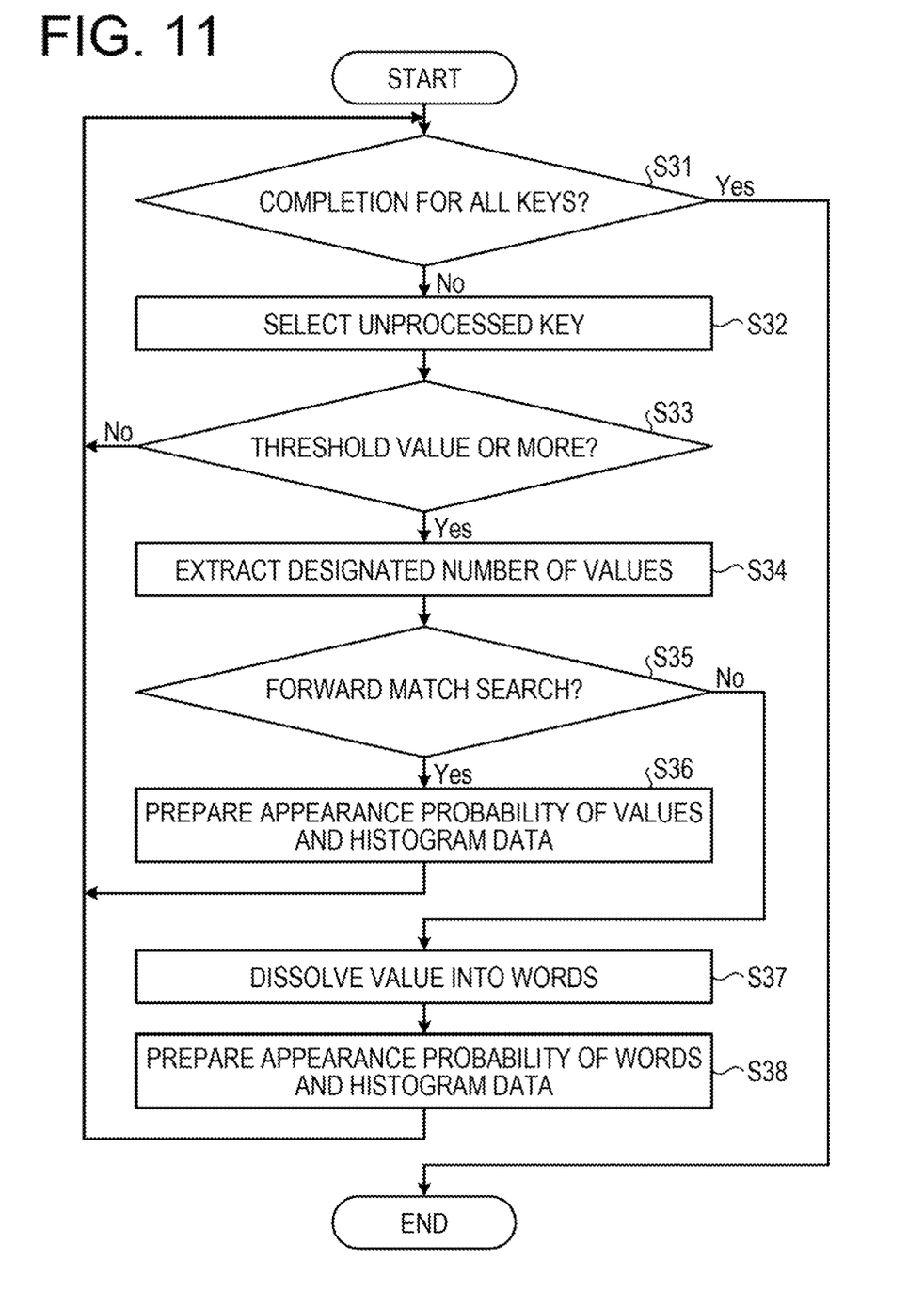
FIG. 11 is a flowchart illustrating a flow of a sampling process performed by a sampling unit.

Next, a flow of a sampling process performed by the sampling unit 8 will be described. FIG. 11 is a flowchart illustrating the flow of the sampling process performed by the sampling unit 8. As illustrated in FIG. 11, the sampling unit 8 determines whether all keys have been processed (S31). When it is determined that all keys have been processed, the sampling unit 8 terminates the sampling process.

When it is determined that there is an unprocessed key, the sampling unit 8 arbitrarily selects one unprocessed key (S32) and determines whether the selected key appears in the table 21 a predetermined times or more (S33). When it is determined that the selected key appears in the table 21 less than the predetermined times, the sampling unit 8 returns to S31.

When it is determined that the selected key appears in the table 21 the predetermined times or more, the sampling unit 8 extracts a designated number of values associated with the selected key (S34). The sampling unit 8 determines whether the search regarding the selected key is the forward match search (S35). When it is determined that the search regarding the selected key is the forward match search, the sampling unit 8 prepares the appearance probability of the respective extracted values and the histogram data thereof and stores the prepared appearance probability and histogram data in the statistical information table 24 (S36). Thereafter, the sampling unit 8 returns to S31.

When it is determined that the search regarding the selected key is not the forward match search, the sampling unit 8 dissolves the respective extracted values into words (S37). The sampling unit 8 prepares the appearance probability of the respective words and the histogram data thereof and stores the prepared appearance probability and histogram data in the statistical information table 24 (S38). Thereafter, the sampling unit 8 returns to S31. The flow may be modified such that the sampling unit 8 performs S36 for one key in parallel with S37 and S38 for another key.

As described above, the sampling unit 8 prepares the appearance probability of a designated number of values and the histogram data thereof or the appearance probability of words (or grams) and the histogram data thereof for each key, and stores the prepared appearance probability and histogram data in the statistical information table 24. Therefore, the estimation engine 5 may calculate the search cost by using the information stored in the statistical information table 24.

Figure 12:
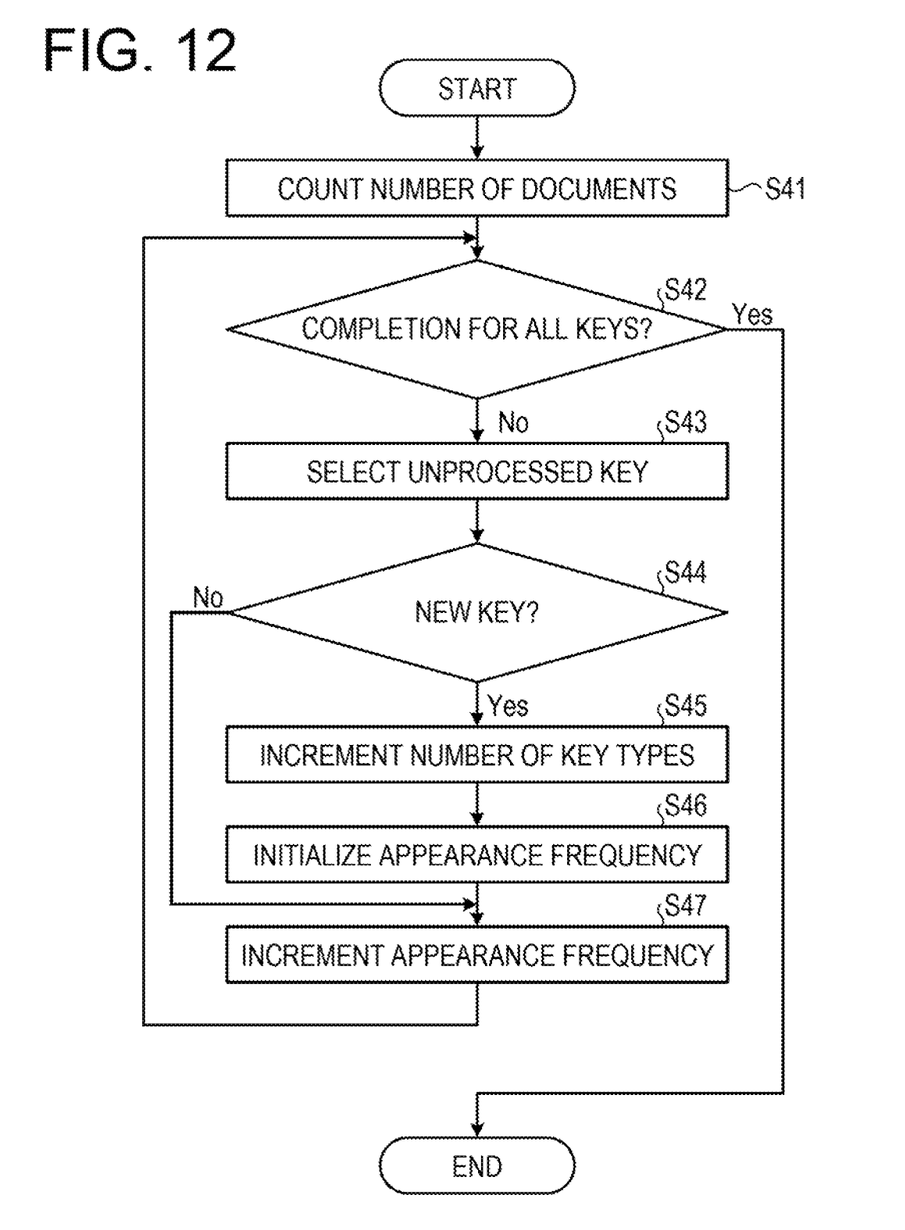
FIG. 12 is a flowchart illustrating a flow of an update process performed by an update unit.

Next, a flow of an update process performed by the update unit 9 will be described. FIG. 12 is a flowchart illustrating the flow of the update process performed by the update unit 9. As illustrated in FIG. 12, the update unit 9 counts the number of documents of the statistical information table 24 (S41) and determines whether all keys have been processed (S42). When it is determined that all keys have been processed, the update unit 9 terminates the update process.

When it is determined that there is an unprocessed key, the update unit 9 arbitrarily selects one unprocessed key (S43) and determines whether the selected key is new (S44). When it is determined that the selected key is not new, the update unit 9 proceeds to S47. When it is determined that the selected key is new, and the update unit 9 increments, by 1, the number of key types in the statistical information table 24 (S45) and initializes the appearance frequency of the selected key to 0 (S46).

The update unit 9 increments, by 1, the appearance frequency of the selected key (S47) and returns to S42.

As described above, the update unit 9 updates the number of key types and the appearance frequency of the key in the statistical information table 24, and as a result, the estimation engine 5 may calculate the search cost by using the information stored in the statistical information table 24.

As described above, according to the embodiment, the RDB cost calculation unit 52 calculates the search cost using the index for each key with reference to the statistical information table 24 and calculates the RDB search cost on the basis of the search cost for the respective keys and a merge cost of merging the search results for the respective keys. Further, the DSE cost calculation unit 53 calculates the search cost using the index for each key with reference to the statistical information table 24 and calculates the DSE search cost on the basis of the search cost for the respective keys and a merge cost of merging the search results for the respective keys. The determination unit 54 compares the RDB search cost calculated by the RDB cost calculation unit 52 and the DSE search cost calculated by the DSE cost calculation unit 53 with each other to predict and select one of the RDB and the DSE, which is lower in search cost. Therefore, the estimation engine 5 may appropriately select one of the RDB and the DSE, which is shorter in search time.

According to the embodiment, the RDB cost calculation unit 52 determines whether the search regarding the key is the forward match search or the intermediate match search and calculates the search cost for each key on the basis of a determination result. Therefore, the estimation engine 5 may calculate the search cost on the basis of the index used in an actual search.

According to the embodiment, since the RDB instruction unit 55 instructs, with a hint, the RDB to perform the search, the RDB may efficiently perform the search on the basis of the statistical information regarding each key.

According to the embodiment, the number of key types (the number of different keys), the number of value types (the number of different values of each key), the histogram data regarding the values of each key, the number of word types (the number of different words or grams included in the values of each key), and the histogram data regarding the words or grams included in the values of each key are recorded in the statistical information table 24. Therefore, the estimation engine 5 may accurately calculate the search cost.

In the embodiment, the document search apparatus 1 has been described, but the configuration of the document search apparatus 1 may be implemented by software to obtain a document search program having the same function. Accordingly, a computer for executing the document search program will be described below.

Figure 13:
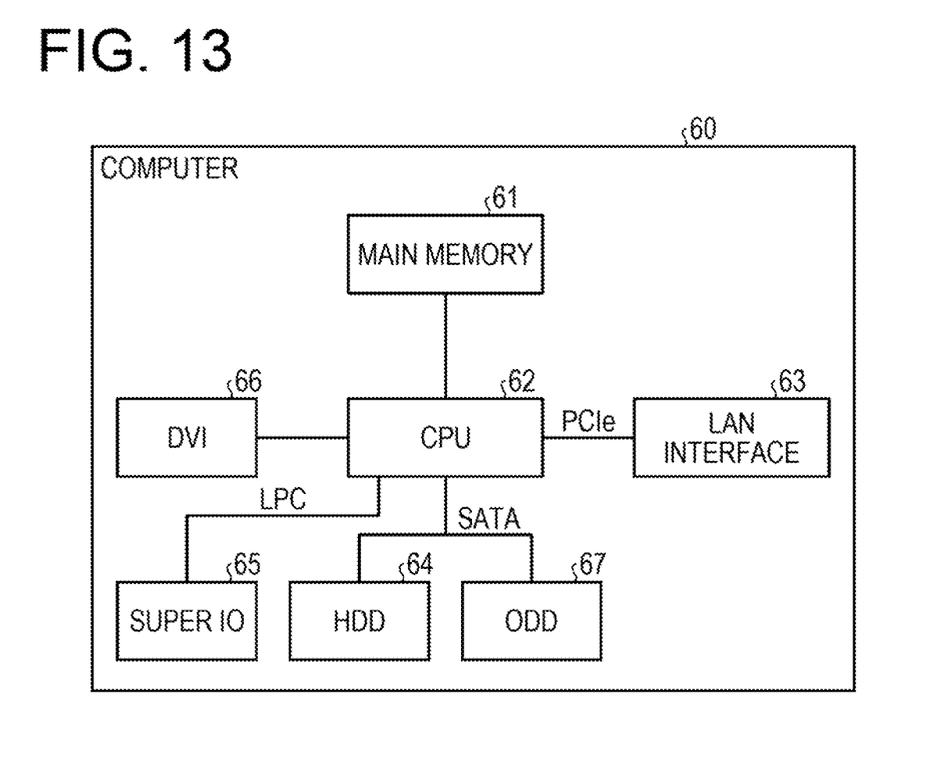
FIG. 13 is a diagram illustrating a hardware configuration of a computer for executing a document search program according to an embodiment.

FIG. 13 is a diagram illustrating a hardware configuration of the computer for executing the document search program according to the embodiment. As illustrated in FIG. 13, a computer 60 includes a main memory 61, a central processing unit (CPU) 62, a local area network (LAN) interface 63, and a hard disk drive (HDD) 64. Further, the computer 60 includes a super input output (IO) 65, a digital visual interface (DVI) 66, and an optical disk drive (ODD) 67.

The main memory 61 is a memory that stores therein a program or an intermediate result obtained during executing the program. The CPU 62 is a processor that reads and executes the program from the main memory 61. The CPU 62 includes a chip set having a memory controller.

The LAN interface 63 is an interface for coupling the computer 60 to another computer via a LAN. The HDD 64 is a disk device that stores the program or data. The super IO 65 is an interface for coupling an input device such as a mouse or keyboard. The DVI 66 is an interface for coupling a liquid crystal display device. The ODD 67 is a device that performs writing or reading of an optical disk such as, for example, a digital versatile disc (DVD).

The LAN interface 63 is coupled to the CPU 62 by Peripheral Component Interconnect express (PCIe) and the HDD 64 and the ODD 67 are coupled to the CPU 62 by Serial Advanced Technology Attachment (SATA). The super IO 65 is coupled to the CPU 62 by Low Pin Count (LPC).

The document search program executed by the computer 60 is stored in the optical disk and read from the optical disk by the ODD 67 and installed in the computer 60. Alternatively, the document search program is stored in the database of another computer system coupled via the LAN interface 63 and read from the database and installed in the computer 60. The installed document search program is stored in the HDD 64, read into the main memory 61, and executed by the CPU 62.

In the embodiment, the case of searching the forms has been described, but the present disclosure is not limited thereto and the present disclosure may be similarly applied even to a case where arbitrary documents are searched.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   receiving a search query including first keys;
   calculating a first score on basis of statistical information, the first score representing search performance of searching a first database in accordance with the search query, the first database storing a data group including combinations of a key and a value of the key, the first database being a relational database and having a B-tree index and a transposed index, the statistical information including information regarding each key included in the data group;
   calculating a second score on basis of the statistical information, the second score representing search performance of searching a second database different from the first database in accordance with the search query, the second database storing the data group;
   selecting the first database or the second database on basis of the first score and the second score;
   instructing the selected database to perform a search in accordance with the search query;
   determining, for each of first keys, whether the search is to be performed by using the B-tree index or the transposed index on basis of whether the search is a forward match search or an intermediate match search;
   calculating third scores representing search performance of searching the first database for the first keys, respectively, on basis of the statistical information in accordance with results of the determining; and
   calculating the first score on basis of the third scores.

2. The non-transitory computer-readable recording medium according to claim 1, the process further comprising:
   selecting the first database when the first score is better than the second score; and
   selecting the second database when the second score is better than the first score.

3. The non-transitory computer-readable recording medium according to claim 1, the process further comprising instructing the first database to perform the search in accordance with the results of the determining upon selecting the first database.

4. The non-transitory computer-readable recording medium according to claim 1, wherein the statistical information includes a number of different keys included in the data group, a number of different values of each of the different keys, histogram data regarding the values of each of the different keys, a number of different words or grams included in the values of each of the different keys, and a histogram data regarding the words or grams included in the values of each of the different keys.

5. A method of searching databases, comprising:
   receiving, by a computer, a search query including first keys;
   calculating a first score on basis of statistical information, the first score representing search performance of searching a first database in accordance with the search query, the first database storing a data group including combinations of a key and a value of the key, the first database being a relational database and having a B-tree index and a transposed index, the statistical information including information regarding each key included in the data group;
   calculating a second score on basis of the statistical information, the second score representing search performance of searching a second database different from the first database in accordance with the search query, the second database storing the data group;
   selecting the first database or the second database on basis of the first score and the second score;
   instructing the selected database to perform a search in accordance with the search query;
   determining, for each of first keys, whether the search is to be performed by using the B-tree index or the transposed index on basis of whether the search is a forward match search or an intermediate match search;
   calculating third scores representing search performance of searching the first database for the first keys, respectively, on basis of the statistical information in accordance with results of the determinations; and
   calculating the first score on basis of the third scores.

6. A database search apparatus, comprising:
   a memory that stores instructions; and
   a processor coupled to the memory and the processor configured to execute the instructions to:
   receive a search query including first keys;
   calculate a first score on basis of statistical information, the first score representing search performance of searching a first database in accordance with the search query, the first database storing a data group including combinations of a key and a value of the key, the first database being a relational database and having a B-tree index and a transposed index, the statistical information including information regarding each key included in the data group;
   calculate a second score on basis of the statistical information, the second score representing search performance of searching a second database different from the first database in accordance with the search query, the second database storing the data group;
   select the first database or the second database on basis of the first score and the second score;
   instruct the selected database to perform a search in accordance with the search query;
   determine, for each of first keys, whether the search is to be performed by using the B-tree index or the transposed index on basis of whether the search is a forward match search or an intermediate match search;
   calculate third scores representing search performance of searching the first database for the first keys, respectively, on basis of the statistical information in accordance with which of the forward and intermediate match search is used; and
   calculate the first score on basis of the third scores.

* * * * *